United States Patent
Bong et al.

(10) Patent No.: US 12,384,076 B2
(45) Date of Patent: Aug. 12, 2025

(54) METHOD FOR FABRICATING MICROPARTICLE BY USING DEGASSED GAS-PERMEABLE MICROMOLD AND DISCONTINUOUS DEWETTING

(71) Applicant: KOREA UNIVERSITY RESEARCH AND BUSINESS FOUNDATION, Seoul (KR)

(72) Inventors: Ki Wan Bong, Seoul (KR); Hyeon Ung Kim, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 158 days.

(21) Appl. No.: 18/270,321

(22) PCT Filed: Dec. 28, 2021

(86) PCT No.: PCT/KR2021/020035
§ 371 (c)(1),
(2) Date: Jun. 29, 2023

(87) PCT Pub. No.: WO2022/145962
PCT Pub. Date: Jul. 7, 2022

(65) Prior Publication Data
US 2024/0091991 A1 Mar. 21, 2024

(30) Foreign Application Priority Data
Dec. 30, 2020 (KR) .......... 10-2020-0187666

(51) Int. Cl.
B29C 39/42 (2006.01)
B29C 39/02 (2006.01)
(Continued)

(52) U.S. Cl.
CPC .............. *B29C 39/42* (2013.01); *B29C 39/02* (2013.01); *B29C 39/26* (2013.01); *C08J 3/14* (2013.01);
(Continued)

(58) Field of Classification Search
CPC ...... C08J 3/14; C08J 2305/12; C08J 2335/02; C08J 2381/02; B01J 13/02; B01J 13/20;
(Continued)

(56) References Cited

U.S. PATENT DOCUMENTS

| | | | |
|---|---|---|---|
| 2004/0259986 A1* | 12/2004 | Kierkels | C07D 251/66 252/609 |
| 2017/0298314 A1* | 10/2017 | Lyons | B01L 3/563 |
| 2021/0170667 A1* | 6/2021 | Lee | B29C 59/021 |

FOREIGN PATENT DOCUMENTS

| | | |
|---|---|---|
| JP | 2013-039757 A | 2/2013 |
| KR | 10-2010-0046818 A | 5/2010 |

(Continued)

OTHER PUBLICATIONS

Kim, Hyeon Ung, et al., "Degassed micromolding lithography for rapid fabrication of anisotropic hydrogel microparticles with high-resolution and high uniformity", Lab on a Chip, Nov. 8, 2019, pp. 74-83, vol. 20, No. 1.
(Continued)

*Primary Examiner* — Abbas Rashid
*Assistant Examiner* — Elisa H Vera
(74) *Attorney, Agent, or Firm* — Sughrue Mion, PLLC (57) ABSTRACT

The present invention relates to a method for fabricating microparticles by using a degassed gas-permeable micromold and discontinuous dewetting. The method for fabricating microparticles according to the present invention comprises the steps of: depressurizing and degassing a porous micro-mold including a plurality of micro-wells
(Continued)

concavely recessed in a predetermined shape and size from one surface thereof (S100); loading a microparticle precursor solution on which the micro-wells are formed, and covering the microparticle precursor solution with a cover substrate (S200); moving the cover substrate to the side (S300); and curing the microparticle precursor solution filled in the micro-wells, thereby synthesizing microparticles (S400).

9 Claims, 11 Drawing Sheets

(51) Int. Cl.
  *B29C 39/26* (2006.01)
  *C08J 3/14* (2006.01)
(52) U.S. Cl.
  CPC ........ *C08J 2305/12* (2013.01); *C08J 2335/02* (2013.01); *C08J 2381/02* (2013.01)
(58) Field of Classification Search
  CPC ........ B01J 13/206; B29C 39/42; B29C 39/02; B29C 39/26
  See application file for complete search history.

(56) References Cited

FOREIGN PATENT DOCUMENTS

KR     10-1276192 B1    6/2013
KR   10-2020-0113980 A  10/2020

OTHER PUBLICATIONS

Li, Xingrui, et al., "Microwell Array Method for Rapid Generation of Uniform Agarose Droplets and Beads for Single Molecule Analysis", Analytical Chemistry, Jan. 19, 2018, pp. 2570-2577, vol. 90, No. 4.
Kim, Hyeon Ung, et al., "Discontinuous Dewetting in a Degassed Mold for Fabrication of Homogeneous Polymeric Microparticles", ACS Applied Materials & Interfaces, Nov. 16, 2020, pp. 53318-53327, vol. 12, No. 47.
Kim, Hyeon Ung, Adviser, Professor Ki Wan Bong, "Degassed Mold Based Fabrication of Anisotropic Microparticles and Biomedical Applications of Anisotropic Microparticles", Department of Chemical and Biological Engineering, Korea University, Feb. 2021.
International Search Report for PCT/KR2021/020035 dated Apr. 22, 2022.
Written Opinion for PCT/KR2021/020035 dated Apr. 22, 2022.
Korean Office Action for Korean Application No. 10-2020-0187666 dated May 30, 2022, 4 pages.

* cited by examiner

METHOD FOR FABRICATING MICROPARTICLE BY USING DEGASSED GAS-PERMEABLE MICROMOLD AND DISCONTINUOUS DEWETTING

CROSS REFERENCE TO RELATED APPLICATIONS

This application is a National Stage of International Application No. PCT/KR2021/020035 filed Dec. 28, 2021, claiming priority based on Korean Patent Application No. 10-2020-0187666 filed Dec. 30, 2020.

TECHNICAL FIELD

The present invention relates to a method for fabricating microparticles, and more specifically to a technology for synthesizing microparticles using the suction force of a degassed microporous mold and discontinuous dewetting.

BACKGROUND ART

Microparticles are actively used in tissue engineering, drug delivery, multiple liquid biopsy, and self-assembly. Particularly, anisotropic microparticles can interact with their surroundings depending on their geometric characteristics (for example, size and shape), unlike spherical particles. For extensive applied research based on these specific interactions, it is necessary to develop a process for mass production of functional microparticles in a simple way.

Replica molding has recently been proposed as a technique for producing microparticles. Replica molding is a simple and economical technique for synthesizing anisotropic microparticles. According to replica molding, microparticles can be fabricated by filling a precursor in microwells engraved with an intaglio pattern on a mold and curing the precursor. The microparticles have the same shape as the microwells. A parallel process for mass production of microparticles can be designed using a plurality of molds prepared by replicating a single master mold several times with an elastomer such as polydimethylsiloxane (PDMS), perfluoropolyether (PFPE) or polyurethane. However, loading of the precursor into the microwells and isolation of the precursor filled in the microwells are technically difficult to achieve, which limits the productivity of microparticles.

Particle replication in non-wetting templates (PRINT) is known as a method for isolating a precursor filled in microwells. According to PRINT, the precursor exists only in the microwells because the remaining precursor between a mold and a cover made of fluorinated polymers with low surface energy are removed by pressing, enabling the synthesis of independent particles. However, the fluorinated polymers for the mold and the cover are expensive, thus being unsuitable for active use. In order to prevent the mold from being wet with the precursor, the surface energy of the precursor should be higher than that of the mold. This limitation restricts the composition of the precursor that can be used. Only when microparticles are synthesized through free-radical polymerization, a thin precursor layer region is not formed by polymerization due to oxygen inhibition and only the precursor in the microwells is polymerized to fabricate microparticles. That is, the polymerization mechanism is limited only to free-radical polymerization, causing a problem in that only microparticles composed of a synthetic polymer can be produced.

Thus, there is an urgent need for a solution to the problems of conventional techniques for fabricating microparticles.

DETAILED DESCRIPTION OF THE INVENTION

Problems to be Solved by the Invention

The present invention has been made in an effort to solve the problems of the prior art and one aspect of the present invention is to provide a method for fabricating microparticles in which the suction force of a degassed porous micromold is used to load a precursor without defects and discontinuous dewetting is used to isolate the precursor in microwells.

A further aspect of the present invention is to provide a method for fabricating microparticles in which a precursor is loaded into a micromold immersed in an oil.

Means for Solving the Problems

A method for fabricating microparticles according to an embodiment of the present invention includes (a) preparing a porous micromold having a plurality of recessed microwells with a predetermined shape and size on one surface thereof and degassing the micromold under reduced pressure, (b) loading a microparticle precursor solution on the one surface of the micromold where the microwells are formed and covering the microparticle precursor solution with a cover substrate, (c) moving the cover substrate laterally, and (d) curing the microparticle precursor solution filled in the microwells to synthesize microparticles.

In an embodiment of the present invention, at least one of the micromold and the cover substrate may be made of one or more polymers selected from the group consisting of polydimethylsiloxane (PDMS), PDMS modified urethane acrylate (PUA), perfluoropolyether (PFPE), and polyethylene (PE).

In an embodiment of the present invention, the cover substrate may be made of one or more materials selected from the group consisting of glass, silicone, metals, and gas impermeable polymers.

In an embodiment of the present invention, the surface of the micromold may be modified to be hydrophilic by plasma treatment.

In an embodiment of the present invention, in step (a), the internal pressure of the micromold may be reduced to 0.1 to 0.5 bar.

In an embodiment of the present invention, the microparticle precursor solution may include a polymer, a monomer or a mixture thereof.

In an embodiment of the present invention, the microparticle precursor solution may further include nanoparticles.

In an embodiment of the present invention, steps (c) and (d) may be carried out in a state in which the micromold and the cover substrate are immersed in an oil.

In an embodiment of the present invention, the oil may be a fluorinated one.

In an embodiment of the present invention, the method may further include (e) recovering the synthesized microparticles.

The features and advantages of the present invention will become apparent from the following description with reference to the accompanying drawings.

Prior to the detailed description of the invention, it should be understood that the terms and words used in the specification and the claims are not to be construed as having common and dictionary meanings but are construed as having meanings and concepts corresponding to the technical spirit of the present invention in view of the principle that the inventor can define properly the concept of the terms and words in order to describe his/her invention with the best method.

Effects of the Invention

According to the method of the present invention, microparticles having a uniform shape and size can be synthesized using the suction force of the gas-permeable micromold to uniformly load the precursor into the micromold in the closed system within a short time (within tens of seconds). Since the precursor is loaded regardless of the area of the micromold, it is possible to enlarge the micromold. The use of the large-area micromold enables the establishment of a system for mass production of microparticles.

The surface tension of a precursor is a very important consideration in a conventional replica molding process where the precursor is loaded by capillary action. In contrast, according to the method of the present invention, the precursor is filled by the suction force of the degassed micromold. Therefore, the method of the present invention enables the production of various types of microparticles irrespective of the surface tension of the precursor.

In addition, the precursor loaded into the microwells is isolated via discontinuous dewetting. Accordingly, various types of microparticles can be chemically produced through free-radical polymerization, addition reaction, and thermoplastic, thermosetting, crystal curing. The precursor may contain a high concentration of magnetic nanoparticles. Also in this case, the precursor containing magnetic nanoparticles can be uniformly loaded into the degassed micromold. The precursor containing magnetic nanoparticles can be arrayed via discontinuous dewetting, followed by curing to synthesize magnetically sensitive microparticles.

The precursor can be loaded into the degassed mold without a separate physical manipulation. Therefore, the precursor loading and discontinuous dewetting are performed in a state in which the micromold is immersed in an oil, so that the precursor can be prevented from being exposed to the air, enabling the fabrication of homogeneous particles without vaporization of the precursor.

BEST MODE FOR CARRYING OUT THE INVENTION

The objects, specific advantages, and novel features of the present invention will become more apparent from the following detailed description and preferred embodiments, examples of which are illustrated in the accompanying drawings. In the description of the present invention, detailed explanations of related art are omitted when it is deemed that they may unnecessarily obscure the essence of the present invention.

Preferred embodiments of the present invention will now be described in detail with reference to the accompanying drawings.

Figure 1:
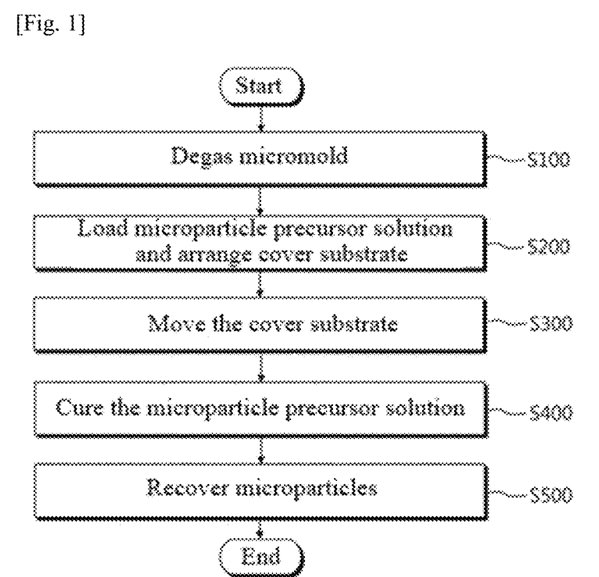
FIGS. 1 and 2 are a flow chart and a flow diagram showing a method for fabricating microparticles according to the present invention, respectively.
Figure 2:
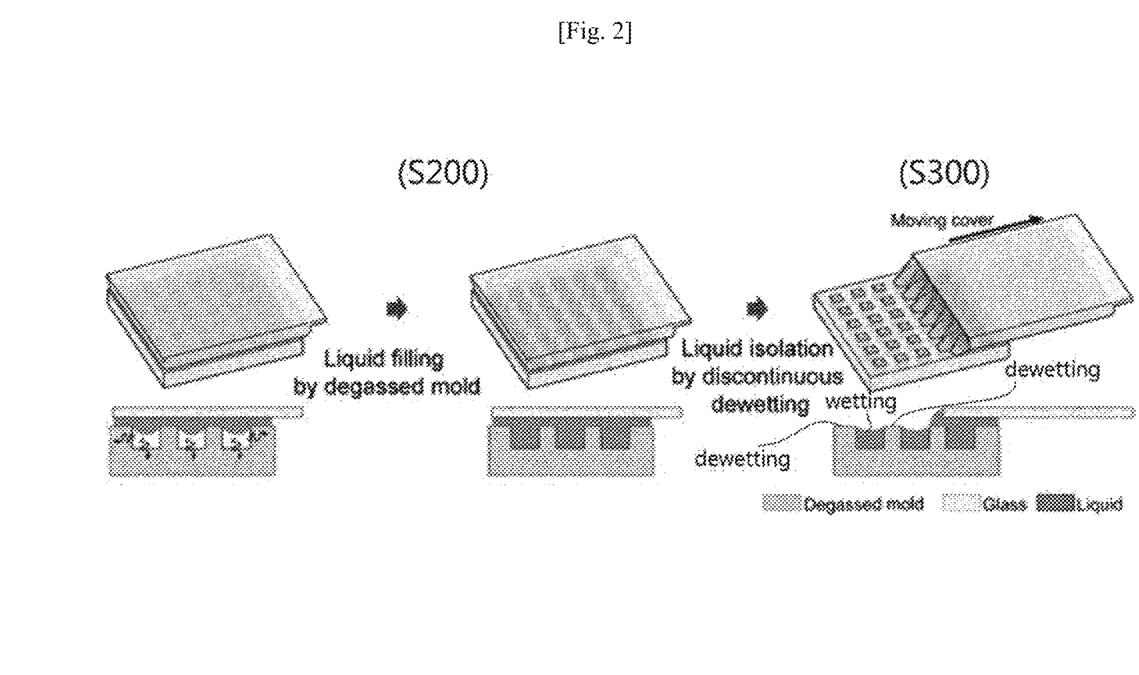

FIGS. 1 and 2 are a flow chart and a flow diagram showing a method for fabricating microparticles according to the present invention, respectively.

As shown in FIGS. 1 and 2, the method includes (S100) preparing a porous micromold having a plurality of recessed microwells with a predetermined shape and size on one surface thereof and degassing the micromold under reduced pressure, (S200) loading a microparticle precursor solution on the one surface of the micromold where the microwells are formed and covering the microparticle precursor solution with a cover substrate, (S300) moving the cover substrate laterally, and (S400) curing the microparticle precursor solution filled in the microwells to synthesize microparticles.

The present invention is directed to a method for fabricating microparticles. A conventional replica molding process for fabricating microparticles has difficulty in loading a precursor into microwells and isolating the precursor filled in the microwells, which limits the productivity of microparticles. Under such circumstances, particle replication in non-wetting templates (PRINT) has been proposed in which a precursor is isolated by pressing between a mold and a cover made of fluorinated polymers with low surface energy. However, the fluorinated polymers are expensive and the surface energy of the precursor should be higher than that of the mold. Due to these limitations, the polymerization mechanism is limited only to free-radical polymerization, causing a problem in that only microparticles composed of a synthetic polymer can be produced. Thus, the present invention has been made as a solution to the above-mentioned problems.

Briefly, the method of the present invention includes (S100) degassing a micromold, (S200) filling a microparticle precursor solution, (S300) moving a cover substrate, and curing (S400).

In S100, a micromold is depressurized to remove gas from pores of the micromold. The micromold is made of a porous material. The porous material may be, for example, polydimethylsiloxane (PDMS), PDMS modified urethane acrylate (PUA), perfluoropolyether (PFPE), polyethylene (PE) or a mixture thereof, but is not necessarily limited thereto. Any porous gas-permeable elastomer may be used without limitation for the micromold.

The micromold has a plurality of microwells formed on one surface thereof. The microwells refer to recessed internal spaces with a predetermined shape and size. A microparticle precursor solution is filled and cured in the microwells to produce microparticles having the predetermined shape of the microwells, which will be described below. That is, the shape of the microwells determines the shape of final microparticles and may vary depending on the desired shape of two- or three-dimensional microparticles. As an example, the microwells may be holes having a circular, polygonal or star-like cross-sectional shape in a direction perpendicular to the depth direction. Protrusions may be formed on the bottom of each of the holes, resulting in the synthesis of hollow internal structures. The microwells may be aligned in an array and may have the same or different shapes and sizes.

The micromold can be manufactured by various techniques. For example, the micromold may be manufactured using a master mold fabricated by photolithography. First, a photoresist is coated on a substrate to form a photoresist film. A mask is placed over the photoresist film and ultraviolet (UV) light is irradiated onto the photoresist film to fabricate a master mold having an embossed pattern corresponding to the microwells. Next, a polymer solution as a porous material is poured onto the master mold and cured to manufacture the micromold. Alternatively, the master mold may be fabricated by 3D printing, E-beam lithography or replica molding instead of photolithography. Thereafter, a polymer solution is poured onto the master mold and cured to manufacture the micromold.

The surface of the micromold may be modified by plasma treatment to lower the wettability between the highly wettable microparticle precursor and the one surface of the micromold. The plasma treatment makes the surface of the micromold hydrophilic.

A cover substrate is used as a member that covers the micromold. The cover substrate may be made of a porous material identical to or different from that for the micromold but is not necessarily limited thereto. A gas impermeable material may also be used for the cover substrate. For example, the cover substrate may be made of at least one material selected from the group consisting of glass, silicone, metals, and gas impermeable polymers (e.g., PE, PMMA, PVC, and NOA81).

When loaded with a microparticle precursor solution, the micromold is arranged such that the one surface of the micromold faces one surface of the cover substrate. A support plate may be attached to each of the other surface of the micromold and the other surface of the cover substrate. The support plates are members that serve to prevent the micromold and the cover substrate from being bent by an external force and control the direction in which oxygen permeates.

The micromold is degassed. For degassing, the micromold is placed in a chamber under reduced pressure. Here, air is diffused due to a difference between the internal pressure of the micromold and the pressure of the vacuum chamber until the air reaches equilibrium in the micromold. The internal pressure of the micromold may be reduced to 0.1 to 0.5 bar during degassing. After completion of the degassing, the pressure in the pores of the porous micromold is lowered, allowing the micromold to have a suction force to suck a fluid at atmospheric pressure. Equilibrium is reached most rapidly when the vacuum chamber is under vacuum and the time to reach equilibrium is determined depending on the degree of vacuum. When the micromold is made of a porous polymer such as PDMS, several to several tens of minutes are needed to reach equilibrium depending on the height of the micromold. Conversely, the suction force of the degassed micromold may be maintained for the same time.

The cover substrate may be made of a porous material. In this case, the cover substrate may be placed in the vacuum chamber and degassed under the same conditions as the micromold. However, the cover substrate is not necessarily degassed and does not have to be degassed under the same conditions as the micromold.

In S200, a microparticle precursor solution is loaded on the one surface of the degassed micromold and covered with the cover substrate. Here, the microparticle precursor solution may be placed on the one surface of the micromold and covered with the cover substrate. In this case, the microparticle precursor solution is pressed down and spreads radially by the weight of the cover substrate or the micromold and is filled in the microwells while air present between the micromold and the microparticle precursor solution is sucked into the micromold by the suction force of the degassed micromold.

That is, the suction force of the degassed micromold is used to load the microparticle precursor solution into the micromold. According to the method of the present invention, since the microparticle precursor solution is loaded into the microwells in the closed system within several tens of seconds, its evaporation is minimized so that chemically uniform particles can be synthesized. In addition, a liquid with low wettability can be loaded into the micromold and the loading time is hardly affected by the viscosity of the microparticle precursor solution, resulting in the synthesis of various types of microparticles. Furthermore, since the loading time of the microparticle precursor solution is the same regardless of the area of the micromold, it is possible to enlarge the micromold. Therefore, an increased amount of the microparticle precursor solution can be loaded into the enlarged micromold to produce microparticles on a large scale.

In S300, the cover substrate covering the microparticle precursor solution is moved laterally. As used herein, the term "lateral" is intended to include directions perpendicular and oblique to the micromold and the cover substrate arranged on each other. The excess microparticle precursor solution that does not fill the microwells is pulled and removed from the micromold by the laterally moving cover substrate. As a result, a dewetting region, from which the microparticle precursor solution is removed, is formed between the adjacent microwells on the one surface of the micromold. The dewetting region is discontinuously arrayed surrounding wetting regions on the microwells.

The discontinuous dewetting occurring due to the movement of the cover substrate isolates the microparticle precursor solution filled in the microwells. The isolation of the microparticle precursor solution loaded into the microwells enables the fabrication of microparticles through various physical and chemical reactions, for example, free-radical polymerization, addition reaction, and thermoplastic, thermosetting, crystal curing.

The cover substrate may be moved at a speed of 0.5 to 3.0 minis but is not necessarily limited thereto.

In S400, the microparticle precursor solution filled in the microwells is cured to synthesize microparticles. The microparticle precursor solution may be a dispersion of the microparticle precursor in a solvent and may include a polymer, a monomer or a mixture thereof. As an example, the microparticle precursor may be a heat-curable or photocurable thermoplastic polymer or monomer. The microparticle precursor may have one or more crosslinkable functional groups that can be crosslinked by free-radical polymerization or addition polymerization. The heat-curable or photocurable functional groups may be, for example, acrylic, epoxy, methacrylic, vinyl, amino or hydroxyl groups. The microparticle precursor having the crosslinkable functional groups may be selected from the group consisting of, but not necessarily limited to, polyethylene glycol diacrylate (PEGDA), polyethylene glycol dimethacrylate (PEGDM), polypropylene glycol diacrylate (PPGDA), and mixtures thereof. Alternatively, the microparticle precursor may be a non-crosslinkable polymeric monomer. In this case, the microparticle precursor solution may further include a crosslinkable polymeric monomer containing crosslinkable functional groups and/or a crosslinking agent for curing. The microparticle precursor solution may further include a thermal initiator or a photoinitiator. Examples of suitable thermal initiators include, but are not limited to, peroxide compounds and azo compounds. Examples of suitable photoinitiators include, but are not limited to, benzoin compounds, hydroxy ketone compounds, and amino ketone compounds. The microparticle precursor may include a natural polymer such as agarose, collagen or gelatin. The microparticle precursor solution may further include nanoparticles. The nanoparticles may have a size of 5 nm to 1 μm but are not limited to this size. The nanoparticles can be uniformly distributed in the microparticles by the degassing of the micromold and discontinuous dewetting. The microparticles loaded with the magnetic nanoparticles can be used to detect biomolecules such as proteins, DNA, and miRNA.

After the curing step, the synthesized microparticles are recovered (S500). The microparticles can be recovered by pouring a solvent onto the micromold or immersing the micromold in a solvent because they are not firmly bound to the microwells by the inhibition layer formed on the surfaces thereof. Alternatively, the microparticles may be recovered by loading a material in a liquid state at room temperature on the one surface of the micromold, cooling and curing the liquid material, and detaching the cured material together with the microparticles. For example, the material may be PEG600 that is cured at −20 to 20° C. Alternatively, the microparticles may be recovered by applying a polymer solution such as a polyvinylpyrrolidone solution to the one surface of the micromold, drying the polymer solution to form a film, and detaching the film. In this case, the microparticles are recovered attached to the film.

Overall, according to the present invention, microparticles having a uniform shape and size can be synthesized using the suction force of the gas-permeable micromold to uniformly load the precursor into the micromold in the closed system within a short time (within tens of seconds). Since the precursor is loaded regardless of the area of the micromold, it is possible to enlarge the micromold. The use of the large-area micromold enables the establishment of a system for mass production of microparticles.

The surface tension of a precursor is a very important consideration in a conventional replica molding process where the precursor is loaded by capillary action. In contrast, according to the present invention, the precursor is filled by the suction force of the degassed micromold. Therefore, the method of the present invention enables the production of various types of microparticles irrespective of the surface tension of the precursor. In addition, the precursor loaded into the microwells is isolated via discontinuous dewetting. Accordingly, various types of microparticles can be chemically produced through free-radical polymerization, addition reaction, and thermoplastic, thermosetting, crystal curing. The precursor may contain a high concentration of magnetic nanoparticles. Also in this case, the precursor containing magnetic nanoparticles can be uniformly loaded into the degassed micromold. The precursor containing magnetic nanoparticles can be arrayed via discontinuous dewetting, followed by curing to synthesize magnetically sensitive microparticles.

S300 and S400 may be carried out in an oil. Since the microparticle precursor solution can be loaded even in an oil, S300 and S400 may be carried out in a state in which the micromold and the cover substrate are immersed in an oil in an oil bath. The oil may be a fluorinated one.

Here, since the microparticle precursor solution is not exposed to the air, microparticles having a uniform composition can be synthesized without the need to evaporate the microparticle precursor solution. After all, the microparticle precursor can be loaded into the degassed mold without a separate physical manipulation. Therefore, the precursor loading and discontinuous dewetting are performed in a state in which the micromold is immersed in an oil, so that the precursor can be prevented from being exposed to the air, enabling the fabrication of homogeneous particles without vaporization of the precursor.

MODE FOR CARRYING OUT THE INVENTION

The present invention will be more specifically explained with reference to the following examples.

Example 1: Synthesis of Microparticles Through Micromold Degassing 1-1. Micromold Manufacture A micropattern for synthesizing microparticles was designed by AutoCAD and printed on a photomask film. SU-8, a negative photosensitizer, was cured by a typical photolithography process to fabricate a master mold. A mixed solution of PDMS and a curing agent in a ratio of 10:1 was poured onto the master mold, air bubbles were removed under reduced pressure in a vacuum chamber for 30 min, and the PDMS was cured at 70° C. for 4 h. The cured PDMS was detached from the master mold and cut to a specific size to manufacture a micromold.

1-2. Preparation of Microparticle Precursor Solutions

94% of polyethylene glycol diacrylate (PEG-DA, MW:700), 5% of Darocur 1173, and 1% of rhodamine-B-acrylate (in PEG200 with 1%) were mixed to prepare a rhodamine-bound microparticle precursor. 45% of PEG-DA, 45% of DTT, and 10% of a buffer (pH 8) were mixed to prepare a precursor for the fabrication of microparticles through thiol-ene Michael addition polymerization. 1-Tetradecanol (100%) was used as a precursor for the fabrication of microparticles through crystallization. 2% of agarose and 1% of a fluorescent protein (FITC-BSA) were dissolved in PBS to prepare an agarose microparticle precursor. A microparticle precursor containing magnetic nanoparticles was prepared that had a composition including 20% of PEGDA, 5% of Darocur 1173, and 75% of magnetic nanoparticles (150 mg/mL, PEG600).

1-3. Precursor Loading Through Micromold Degassing and Precursor Array Construction The PDMS micromold was placed on a cover glass, put into a vacuum chamber, and degassed at 0.1 bar for 20 min.

Figure 3:
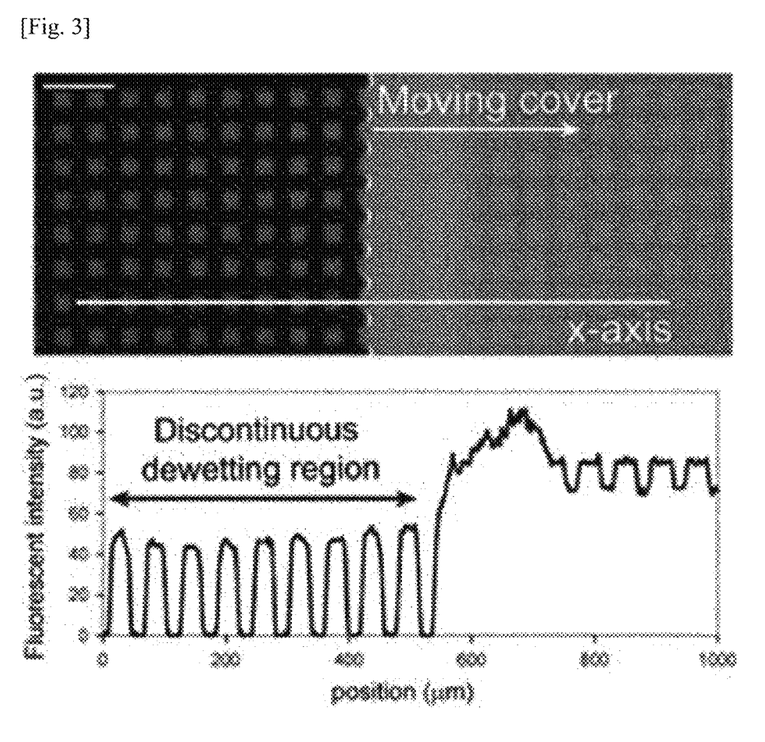
FIG. 3 is a fluorescence microscopy image showing discontinuous dewetting during the fabrication of microparticles in Example 1-3.

Immediately after taking the micromold out of the vacuum chamber, 10 µl of each of the precursors was placed on the micromold. The micromold was covered with a cover glass. The precursor was spread on the surface of the micromold by the weight of the cover glass. The thickness of the precursor solution was about 50 µm. The precursor began to fill the microwells when the micromold sucked the ambient air. The precursor was completely filled in the microwells within 60 sec. Thereafter, the cover glass was moved at a speed of 2 mm/s to remove the residual precursor from the surface of the mold. FIG. 3 is a fluorescence microscopy image showing discontinuous dewetting during the fabrication of microparticles. As shown in FIG. 3, when the precursor was loaded into the degassed micromold and the cover glass was moved to isolate the precursor in the microwells, a discontinuous dewetting region was formed on the surface of the mold.

1-4. Synthesis of Particles Through Radical Polymerization (UV Lithography) and Recovery of the Particles FIG. 4 shows a) a flow diagram illustrating the synthesis of microparticles through radical polymerization and the recovery of the microparticles and b), c) microscopy images of the recovered microparticles.

Figure 4:
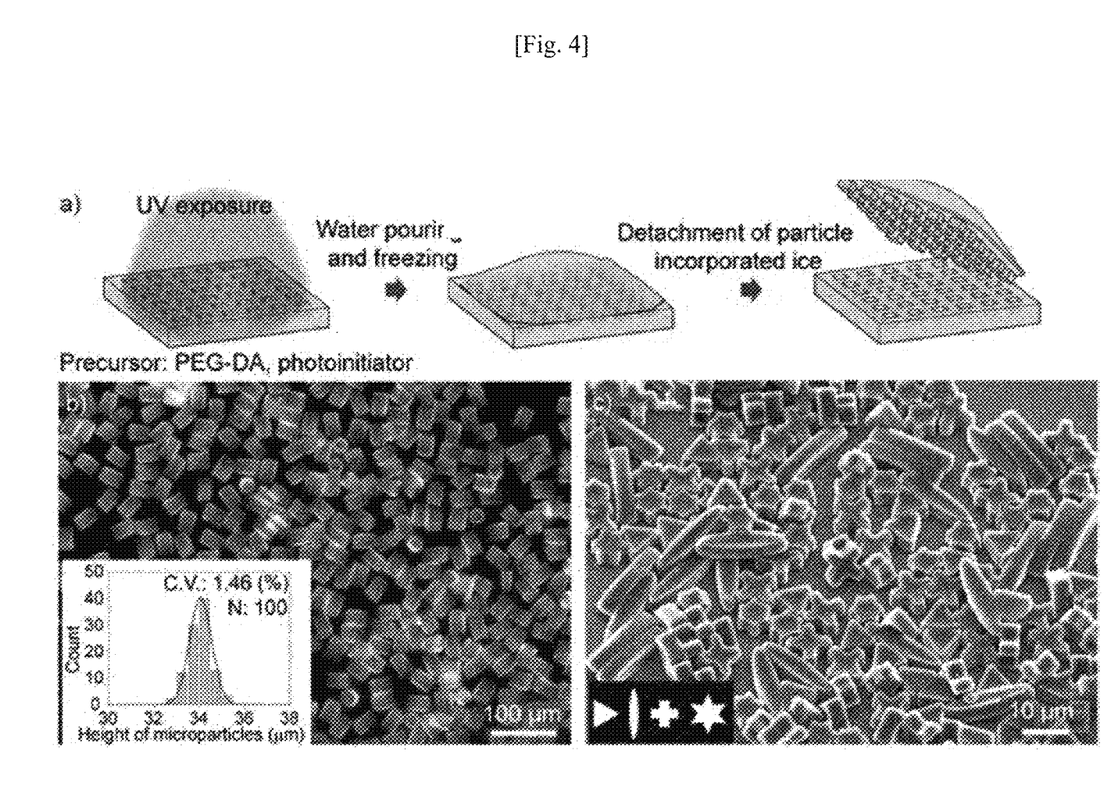
FIG. 4 shows a) a flow diagram illustrating the synthesis of microparticles through radical polymerization and the recovery of the microparticles and b), c) microscopy images of the recovered microparticles in Example 1-4.

As shown in a) FIG. 4, an array of the rhodamine-bound microparticle precursor constructed via discontinuous dewetting was irradiated with UV light at a wavelength of 365 nm for free-radical polymerization to synthesize microparticles. After water was poured onto the mold and frozen in a freezer (−20° C.) for 1 h, ice was detached and recovered together with microparticles. Polyvinylpyrrolidone was dissolved at a concentration of 20% in ethanol, placed on the mold, and dried at room temperature to form a film. When the film was detached, the microparticles were recovered attached to the film.

b) of FIG. 4 shows microparticles produced by radical polymerization of the precursor filled in circular microwells. As shown in b) of FIG. 4, the microparticles were very uniform in size and shape. c) of FIG. 4 shows microparticles produced by radical polymerization of the precursor filled in triangular, oval, cruciform, and star-shaped microwells. As shown in c) of FIG. 4, the microparticles had shapes corresponding to those of the microwells.

1-5. Synthesis of Microparticles Via Thiol-Ene Michael Addition Polymerization

Figure 5:
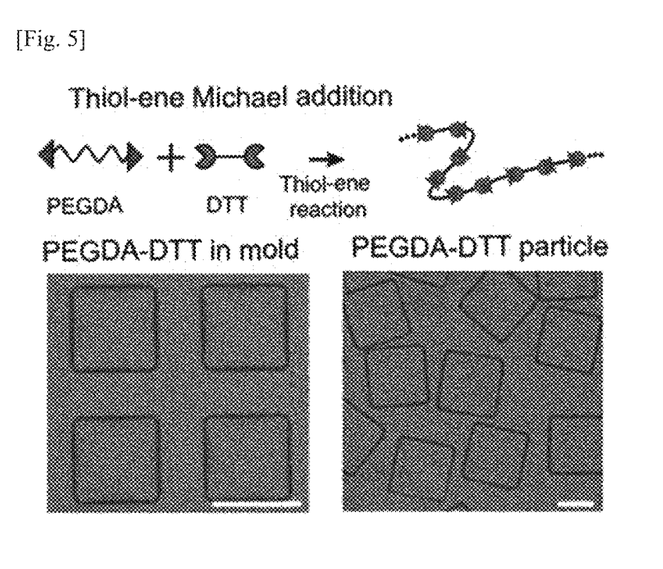
FIG. 5 shows the synthesis of microparticles via thiol-ene Michael addition polymerization in Example 1-5.

FIG. 5 shows the synthesis of microparticles via thiol-ene Michael addition polymerization. Specifically, FIG. 5 shows an image of the mold in which the precursor for the fabrication of microparticles through thiol-ene Michael addition polymerization was arrayed after discontinuous dewetting and an image of microparticles fabricated by polymerization at room temperature for 3 days. These images demonstrated that microparticles can be synthesized by addition polymerization as well as radical polymerization according to the inventive method.

1-6. Fabrication of 1-Tetradecanol Microparticles Through Crystallization

Figure 6:
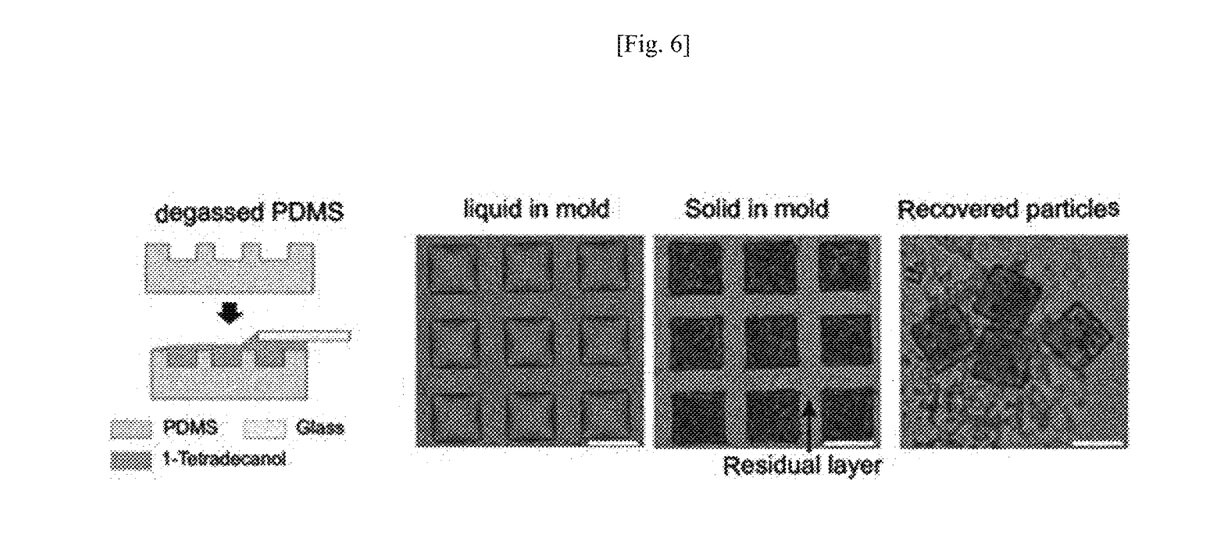
FIG. 6 shows the synthesis of microparticles through crystallization in Example 1-6.

FIG. 6 shows the synthesis of microparticles through crystallization. Referring to FIG. 6, particles were produced via discontinuous dewetting of the precursor for the fabrication of microparticles through crystallization. Due to the high wettability between the PDMS mold and 1-tetradecanol, 1-tetradecanol remained coated on the surface of the PDMS mold even after discontinuous dewetting, with the result that a non-uniform film was fabricated together with particles.

Figure 7:
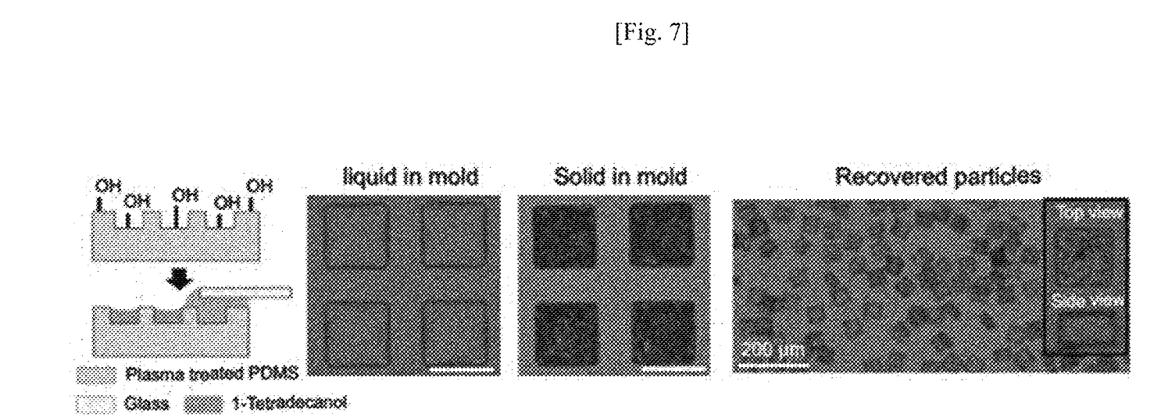
FIG. 7 shows the synthesis of microparticles using a plasma-treated PDMS mold in Example 1-6.

For this reason, it was necessary to reduce the wettability between 1-tetradecanol and the mold. To this end, the surface of the PDMS mold was modified to be hydrophilic using a plasma system, 1-tetradecanol was heated to 60° C. and loaded into the mold, and an array of the precursor was constructed via discontinuous dewetting and left standing at room temperature for ~10 min for crystallization. FIG. 7 shows the synthesis of microparticles using the plasma-treated PDMS mold. When FIG. 7 was compared with FIG. 6, the surface modification of the mold by plasma treatment led to the synthesis of uniform microparticles without film formation.

Figure 8:
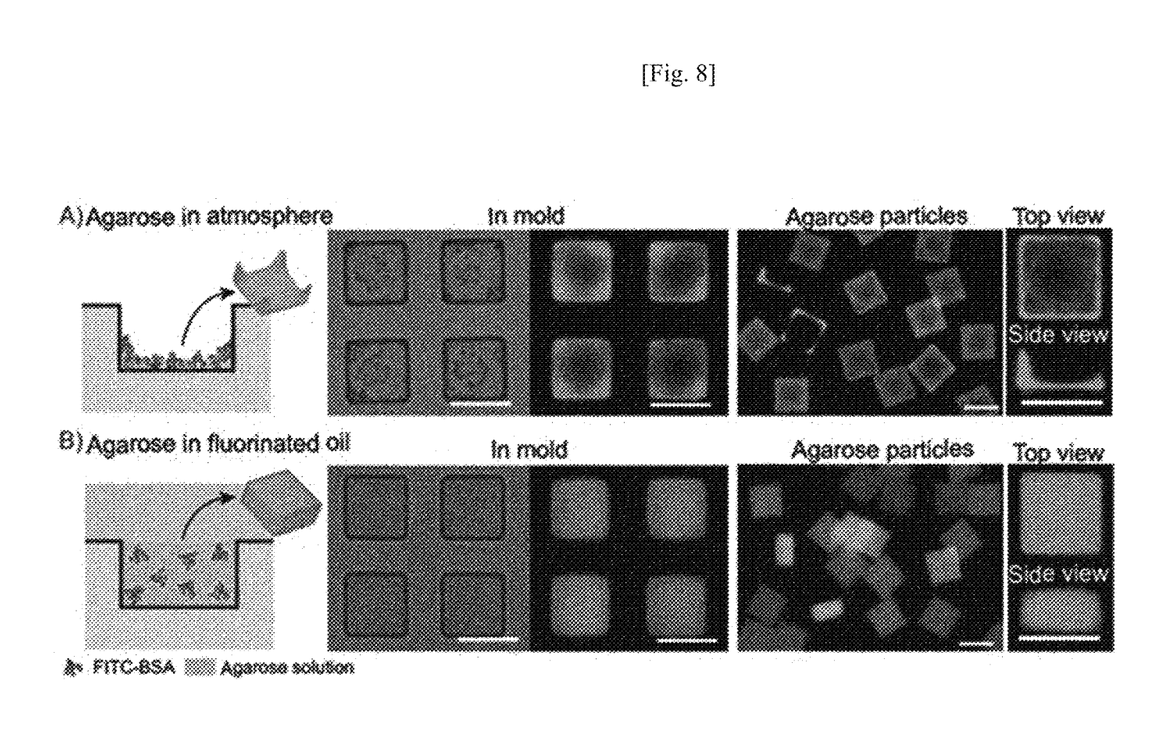
FIG. 8 shows the synthesis of microparticles through the introduction of an oil layer in Example 2.

Example 2: Production of Microparticles Introduced with Oil Layer Via Discontinuous Dewetting 2-1. Fabrication of Protein-Containing Agarose Particles in the Atmosphere FIG. 8 shows the synthesis of microparticles through the introduction of an oil layer. Specifically, A) and B) of FIG. 8 show the synthesis of protein-containing agarose particles in the atmosphere and in an oil layer, respectively.

Referring to A) of FIG. 8, the PDMS mold was heated to 80° C. in a vacuum chamber under reduced pressure and taken out of the vacuum chamber, the agarose solution was heated to 90° C., placed on the PDMS mold, and pressed with a cover glass to load the precursor, and the cover glass was pulled in the atmosphere for discontinuous dewetting to construct an array of the agarose solution. After water vaporization at room temperature for ~1 h, cured microparticles were recovered. The particles had a shell shape because they were cured by water vaporization. Further, aggregation of the fluorescent protein by water vaporization occurred, which is responsible for non-uniform fluorescence properties of the particles.

2-2. Fabrication of Protein-Containing Agarose Particles Introduced with Oil Layer Referring to B) of FIG. 8, the PDMS mold was heated to 80° C. in a vacuum chamber under reduced pressure and taken out of the vacuum chamber, the agarose solution was heated to 90° C., placed on the PDMS mold, and pressed with a cover glass to load the precursor, FC-40 was heated to 70° C. and poured onto the mold until the cover glass was submerged, and the cover glass was pulled for discontinuous dewetting to construct an array of the agarose solution. Curing was allowed to proceed at 4° C. for 24 h during submergence in FC-40 to synthesize microparticles. As a result, the agarose was cured in a hexahedral shape because the oil prevented the agarose solution from being exposed to the air. The particles showed uniform fluorescence properties because the fluorescent protein did not aggregate.

Figure 9:
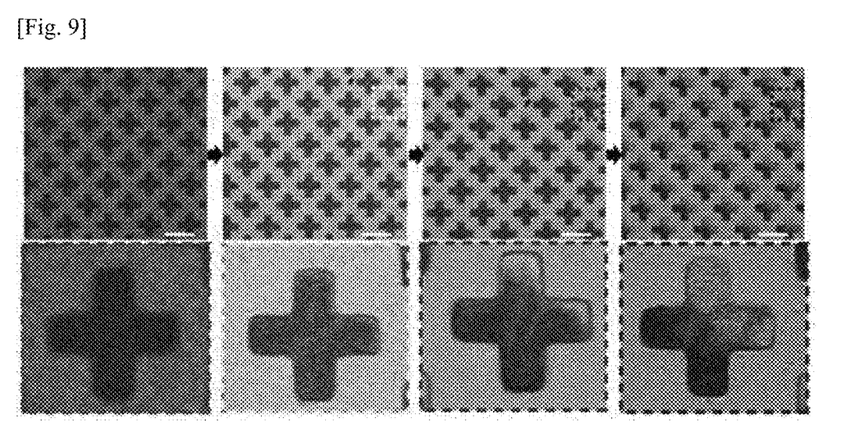
FIG. 9 shows microscopy images of microparticles loaded with magnetic nanoparticles fabricated in Example 3-1.

Example 3: Fabrication of Microparticles Containing Magnetic Nanoparticles and Use of the Microparticles for Protein Detection 3-1. Fabrication of Microparticles Containing Magnetic Nanoparticles FIG. 9 shows microscopy images of microparticles loaded with magnetic nanoparticles. The precursor containing magnetic nanoparticles was loaded between the mold and a substrate, and then the substrate was pressed. As a result, non-uniform dispersion of the nanoparticles was observed, as shown in FIG. 9.

Figure 10:
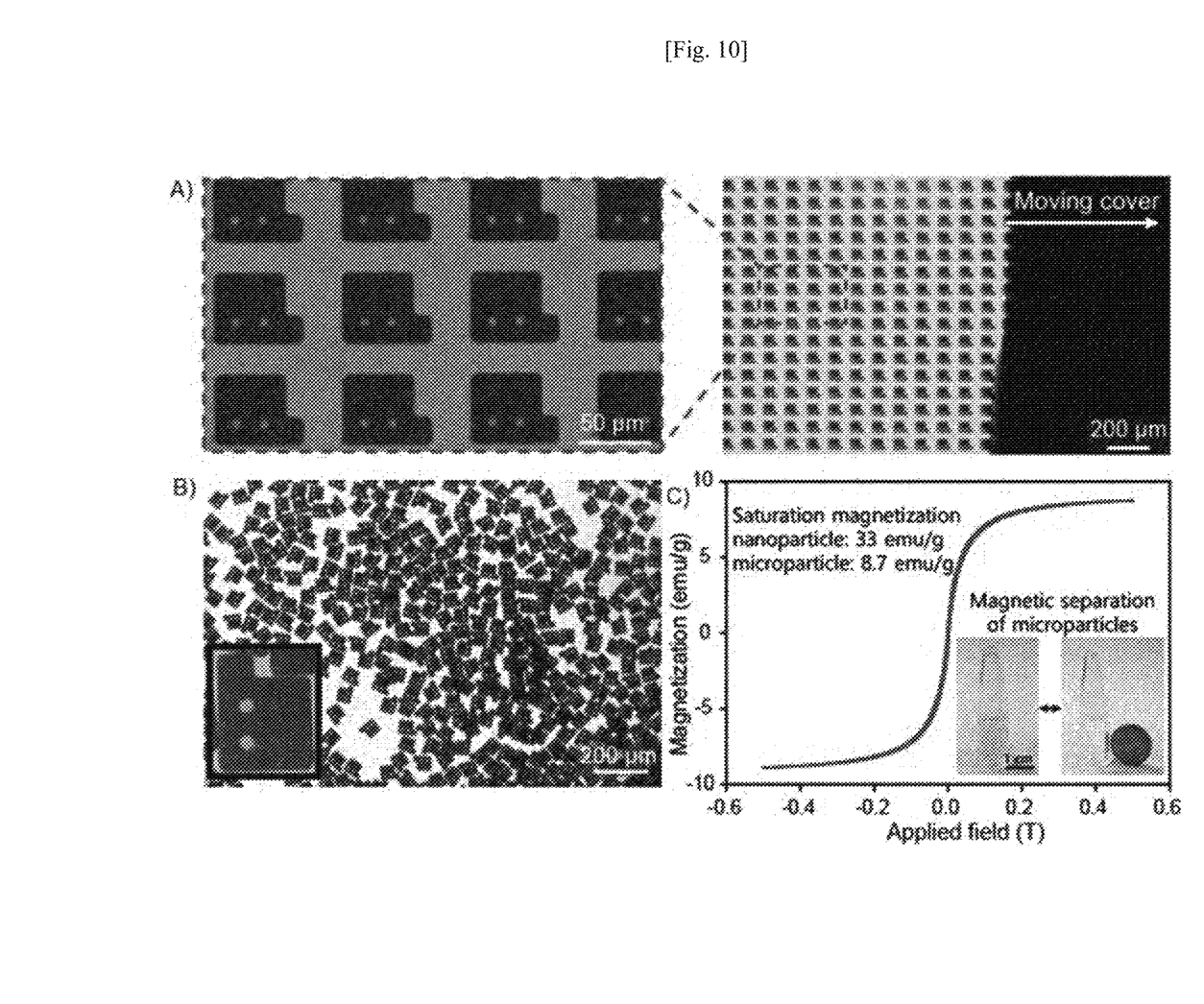
FIG. 10 shows A), B) microscopy images and C) a magnetization profile of microparticles loaded with magnetic nanoparticles fabricated in Example 3-1.

FIG. 10 shows A), B) microscopy images and C) a magnetization profile of microparticles loaded with magnetic nanoparticles. After the precursor solution was arrayed via discontinuous dewetting, the dispersed form of the magnetic nanoparticles was observed. The magnetic nanoparticles were uniformly dispersed in the precursor solution, as shown in A) of FIG. 10. After an array of the precursor was constructed via discontinuous dewetting, the pressure of the mold dropped to 0.1 atm in a vacuum chamber, followed by irradiation with ultraviolet light for free-radical polymerization to synthesize microparticles. An image of the microparticles is shown in B) of FIG. 10. The microparticles containing magnetic nanoparticles were successfully synthesized despite the ability of the magnetic nanoparticles to absorb UV light. Referring to C) of FIG. 10, the saturation magnetization value of the nanoparticle-containing microparticles was measured to be as high as 8.7 emu/g.

3-2. Use for Protein Detection

Figure 11:
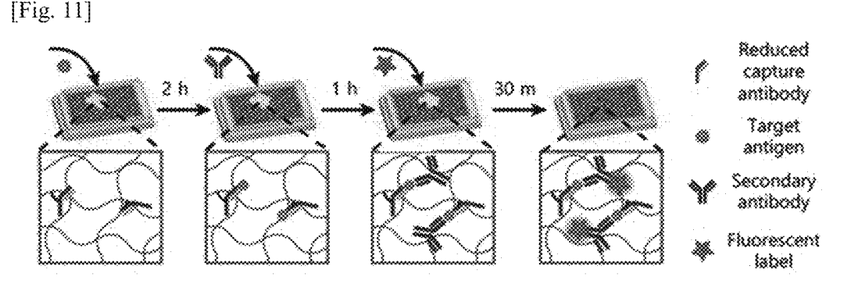
FIG. 11 shows a protein detection protocol using microparticles loaded with magnetic nanoparticles in Example 3-2.
Figure 12:
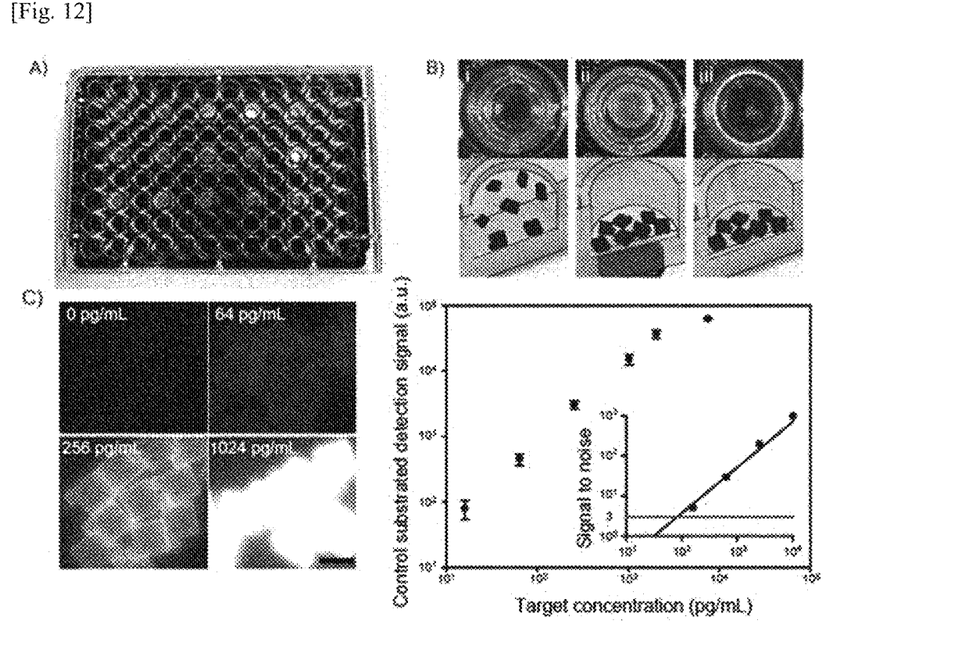
FIG. 12 shows protein detection using microparticles loaded with magnetic nanoparticles in Example 3-2.

FIG. 11 shows a protein detection protocol using the microparticles loaded with magnetic nanoparticles and FIG. 12 shows protein detection using the microparticles loaded with magnetic nanoparticles.

Referring to FIG. 11, a capture antibody as a probe for PLFG protein detection was bound to the surface of the microparticles containing magnetic nanoparticles, 40 μl of a solution of 70 microparticles and 40 μl of PLGF protein as a target antigen were dispensed into the wells of a 96-well plate, followed by incubation at 25° C. for 2 h. Rinsing was repeated 4 times to remove residual protein unbound to the microparticles. The rinsing was performed in such a manner that a magnet was fixed at the bottom of each of the microwells, the microparticles were allowed to aggregate at the bottom of the well due to the magnetism of the magnet, and the microwell was shaken off (see A) and B) of FIG. 12). Thereafter, a secondary antibody and a fluorescent label (SA-PE) were allowed to bind to the microparticles, followed by rinsing. As shown in C) of FIG. 12, the fluorescence intensity of the particles was measured using a fluorescence microscope and compared with the amount of the protein used. As a result, the fluorescence intensity increased in proportion to the amount of the protein, demonstrating that the microparticles containing magnetic nanoparticles synthesized by the inventive method can be utilized to detect biomolecules such as proteins, DNA, and miRNA.

Although the present invention has been described herein with reference to the foregoing specific embodiments, these embodiments do not serve to limit the invention and are set forth for illustrative purposes. It will be apparent to those skilled in the art that modifications and improvements can be made without departing from the spirit and scope of the invention.

Simple modifications and changes of the present invention belong to the scope of the present invention and the specific scope of the present invention will be clearly defined by the appended claims.

INDUSTRIAL APPLICABILITY

According to the method of the present invention, the suction force of a degassed porous micromold is used to load a precursor without defects and discontinuous dewetting is used to isolate the precursor in microwells, enabling the synthesis of microparticles having a uniform shape and size. In addition, since the precursor is loaded regardless of the area of the micromold, it is possible to enlarge the micromold. The use of the large-area micromold enables the establishment of a system for mass production of microparticles. Therefore, the present invention is considered industrially applicable.

The invention claimed is:

1. A method for fabricating microparticles comprising a step of (a) preparing a porous micromold having a plurality of recessed microwells with a predetermined shape and size on one surface thereof and degassing the micromold under reduced pressure, a step of (b) loading a microparticle precursor solution on the one surface of the micromold where the microwells are formed and covering the microparticle precursor solution with a cover substrate, a step of (c) moving the cover substrate laterally, and a step of (d) curing the microparticle precursor solution filled in the microwells to synthesize microparticles,
   wherein the step (c) and the step (d) are carried out in a state in which the micromold and the cover substrate are immersed in an oil.

2. The method according to claim 1, wherein at least one of the micromold and the cover substrate is made of one or more polymers selected from the group consisting of polydimethylsiloxane (PDMS), PDMS modified urethane acrylate (PUA), perfluoropolyether (PFPE), and polyethylene (PE).

3. The method according to claim 1, wherein the cover substrate is made of one or more materials selected from the group consisting of glass, silicone, metals, and gas impermeable polymers.

4. The method according to claim 1, wherein the surface of the micromold is modified to be hydrophilic by plasma treatment.

5. The method according to claim 1, wherein, in the step (a), the internal pressure of the micromold is reduced to 0.1 to 0.5 bar.

6. The method according to claim 1, wherein the microparticle precursor solution comprises a polymer, a monomer or a mixture thereof.

7. The method according to claim 6 wherein the microparticle precursor solution further comprises nanoparticles.

8. The method according to claim 1, wherein the oil is a fluorinated one.

9. The method according to claim 1, further comprising a step of (e) recovering the synthesized microparticles.

* * * * *